United States Patent

Shockovsky

[11] 4,132,254
[45] Jan. 2, 1979

[54] PORTABLE PLANING MACHINE

[76] Inventor: Robert E. Shockovsky, 4016 Landside Dr., Louisville, Ky. 40220

[21] Appl. No.: 844,216

[22] Filed: Oct. 21, 1977

[51] Int. Cl.² .............................................. B27C 1/14
[52] U.S. Cl. .............................. 144/134 D; 90/12 D; 144/136 C
[58] Field of Search ........................ 90/12 D, DIG. 3; 144/134 R, 134 A, 134 D, 136 R, 136 C, 323; 33/32 B, 32 C

[56] References Cited
U.S. PATENT DOCUMENTS

| | | | |
|---|---|---|---|
| 2,751,945 | 6/1956 | Beach | 144/136 C |
| 3,003,527 | 10/1961 | Fortune | 144/134 D |
| 3,418,883 | 12/1968 | Leibow | 144/134 R |
| 3,478,788 | 11/1969 | Zelik | 144/136 C |
| 3,827,468 | 8/1974 | Markham | 144/136 R |

Primary Examiner—Travis S. McGehee
Assistant Examiner—W. D. Bray
Attorney, Agent, or Firm—Price & Caslin

[57] ABSTRACT

A portable planing machine is shown that is adapted to straddle the work piece and is freely movable on a work bench. The machine comprises a pair of runners that are joined by a pair of rails or ways. An adjustable carriage is supported on the rails, and a router is fastened to the carriage. A datum or guide bar is carried by the rails to engage the side of the work piece and guide the movement of the planing machine along the length thereof. After each pass of the planing machine, the carriage is reset to reposition the cutter of the router for the next pass or travel of the machine. Special care is taken in leveling and clamping the work piece so the least amount of material need be removed to accomplish the desired result.

15 Claims, 4 Drawing Figures

U.S. Patent Jan. 2, 1979 4,132,254
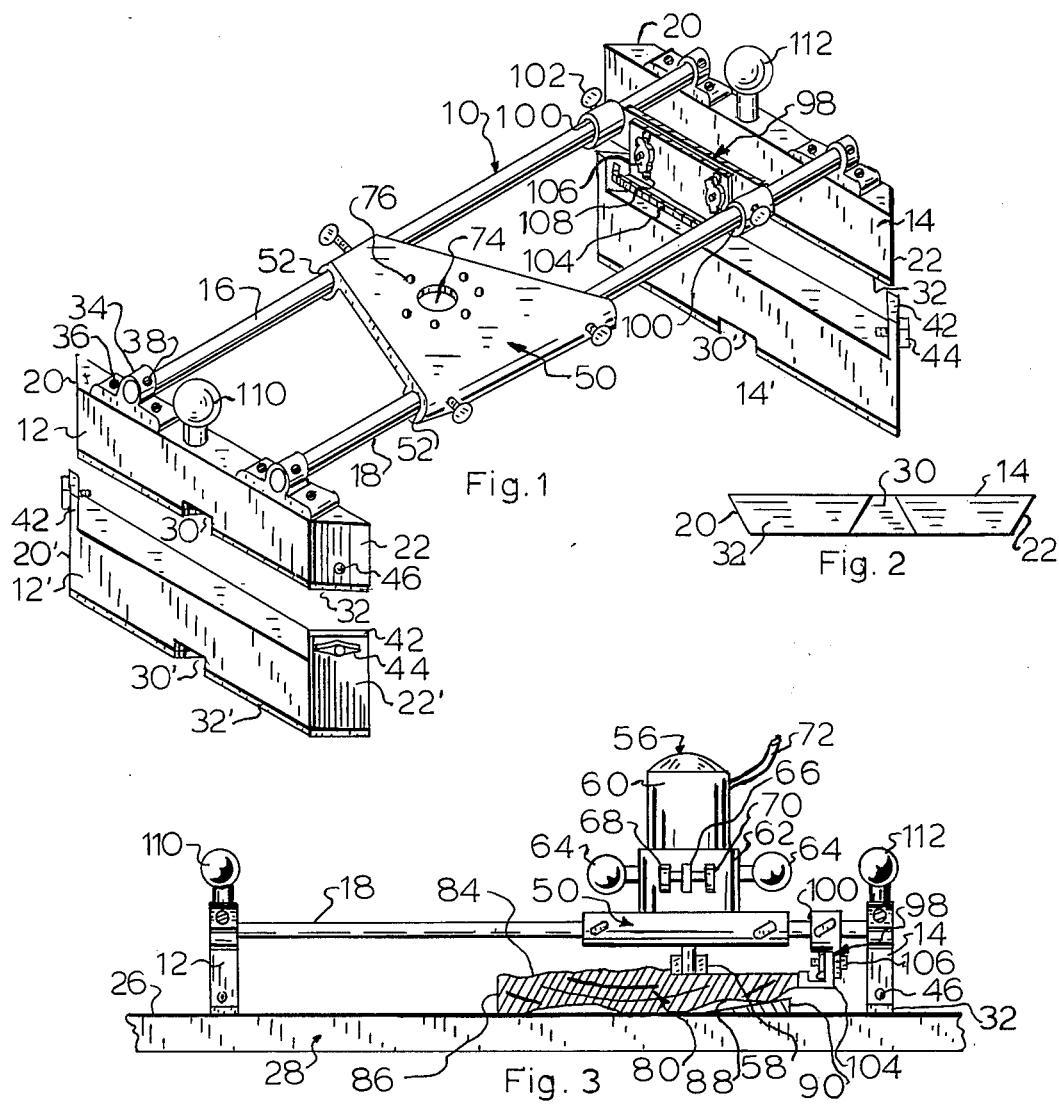
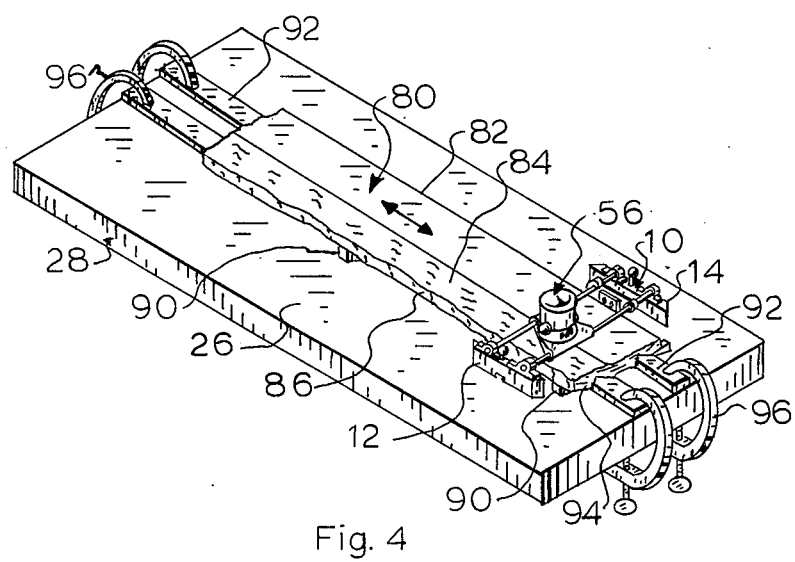

PORTABLE PLANING MACHINE

BACKGROUND OF THE INVENTION

1. Field of the Invention

This invention relates to a portable planing machine for use in the woodworking and metal working arts to remove surface distortions and reduce thicknesses of material with a minimum and predictable loss of material.

2. Description of the Prior Art

There has been an ever-growing use of portable power tools by craftsmen in both the woodworking and metal working arts. Portable planing machines have also been known before, but some of them were supported directly by the work piece. Hence, some of the prior art portable power planes tended to distort the work piece or followed the distortions already present in the work piece. One example of such prior art is shown in the Skolnik U.S. Pat. No. 1,641,645, which appears to be a combination of a jack plane and a modified router having a series of four vertically-supported cutters. This Skolnik plane is supported directly by the work piece.

Another such portable planing machine that is supported directly by the work piece is described in the Beggs U.S. Pat. No. 1,319,557. This patent has a motor with a horizontal shaft that drives both a front and rear horizontal planing roller, on which the machine is supported.

Another prior art patent is Svendsen U.S. Pat. No. 1,139,383, which shows a log supported between two sawhorses. These sawhorses also carry a pair of parallel adjustable rails which extend the length of the log. The rails form a track on which is supported a rail car with double flanged wheels which ride the track. The rail car includes a motor with a horizontal shaft that drives a belt to power a horizontal rotary plane that is vertically adjustable. The log is subject to distortions, as it is suspended between two distant supports. Likewise the two rails are also subjected to distortions as the rail car travels back and forth.

The next prior art patent is Coleman U.S. Pat. No. 2,454,992, which is usable with a butcher's meat block to cut away the top surface and provide a new working surface. A trackway is attachable at the opposite sides of the meat block, and it supports a carriage that is provided with a motor having a vertical shaft with a circular saw blade for re-surfacing the meat block. The carriage also is provided with a vertical attachment or accessory for driving a sanding disk.

A patent in an unrelated and non-analogous art is the Westman U.S. Pat. No. 1,647,066, which shows a resurfacing machine for an ice skating rink. This machine has a frame supported by a pair of rear runners and a front motor-driven tractor wheel. The machine has a electric motor for driving the front wheel by means of a rope drive. The motor has a horizontal shaft that is coupled to a series of four interconnected cutter heads for shaving off the top surface of the ice. Each of the two runners of the machine is individually vertically adjustable, but again the machine is supported directly on the work piece.

The principal object of the present invention is to provide a portable planing machine for use on a work bench on which the work piece is fixdly supported. The planing machine is freely movable on the work bench, and the weight of the machine and its cutting action does not tend to distort the work piece.

A further object of the present invention is to provide a portable planing machine of the class described which is supported independently of the work piece, and does not follow the distortions that are inherent in the work piece.

A further object of the present invention is to provide a portable planing machine of the class described with means for guiding the machine as it passes over the work piece.

A still further object of the present invention is to provide a method of planing a work piece using a portable planing machine on a work bench, so as to remove the surface distortions with a minimum loss of material, and reduce the thickness of material in an accurate, predictable amount.

SUMMARY OF THE INVENTION

The present invention relates to a portable planing machine, and an accurate method of planing a work piece that is fixedly supported on a work bench. The planing machine straddles the work piece and slides on spaced runners which are joined together by parallel ways. An adjustable carriage is mounted on the ways. A router is attached to the carriage and it has a cutter to plane the top surface of the work piece. A datum bar is carried by the machine and it engages the side of the work piece to guide the movement of the machine along the length thereof.

BRIEF DISCRIPTION OF THE DRAWINGS

This invention will be better understood from the following description taken in conjunction with the accompanying drawings, and its scope will be pointed out in the appended claims.

FIG. 1 is an exploded perspective view of the portable planing machine of the present invention with the router removed to best show the nature of the adjustable carriage that is supported on the cross-rails or ways. Additional blocks are shown positioned beneath each runner for engaging each runner and building up the height of the machine to accomodate larger size work pieces.

FIG. 2 is a bottom view of one of the runners of the planing machine showing its phenolic plastic, low friction sliding surface configuration with its tapered leading edges for cleaning the surface of the work bench and deflecting the sawdust and shavings out of the way.

FIG. 3 is a rear elevational view of the planing machine of the present invention in its working environment supported on a work bench, with a router mounted on its carriage, and the work piece positioned generally horizontally by means of wedges so as to require the removal of the least amount of material. Also shown is the datum bar carried by the rails or ways and engaging the side of the work piece for guiding the machine as it is pushed along the length of the work piece.

FIG. 4 is a perspective view on a reduced scale of a work bench on which a work piece is clamped or held from movement. The planing machine of the present invention is shown straddling the working piece for movement along the length thereof.

DESCRIPTION OF THE PREFERRED EMBODIMENTS

Turning now to a consideration of the drawings, and in particular, to the perspective view of FIG. 1, there is shown a portable planing machine 10 comprising a pair of spaced runners 12 and 14 which are joined together by a pair of parallel rails or ways 16 and 18 to form a sled-like frame. Each runner 12 and 14 is a metal block having tapered leading edges 20 and 22 at the opposite ends. These tapered edges serve to clear the top surface 26 of the work bench 28 of sawdust and shavings and help to maintain the runners flush on the work bench. Looking at the bottom view of FIG. 2, an added feature in the bottom surface of each runner 12 and 14 is a transverse slot 30 near the center thereof for collecting debris which may have passed under the forward portion of the runner.

The bottom surface of each runner 12 and 14 is also furnished with a low friction sole plate 32 of phenolic or the like to improve the sliding action between the runners and the work bench.

Each rail or way 16 and 18 is a steel rod that is fitted into a bearing member 34 that is mounted on the top surface of the runners by means of fasteners 36. A set screw 38 is supplied with each bearing member to engage the rod and lock it in place. It should be understood that the distance between the runners 12 and 14 may be adjusted to accomodate work pieces of different sizes.

Another adjustment of this planing machine 10 is a vertical adjustment to raise the machine to accomodate work pieces of larger sizes. In FIG. 1, beneath each runner 12 and 14 is shown a gauge block 12' and 14' respectively for building the height of each runner. The guage blocks 12' and 14' are generally of the same configuration as the mating runner and they have leading edges 20' and 22', sole plate 32' and slot 30'. In addition, each gauge block also has a set of vertical flanges 42. Each flange is fitted with a set screw 44 for reception by a threaded hole 46 in the side of the leading edge of the adjacent runner for locking the gauge block onto the runner. It should be understood that the use of one or more sets of gauge blocks 12' and 14' is incremental in nature, and that an alternative method of design would be to build in vertical adjustability in each runner 12 and 14 to achieve the desired height of the planing machine.

Positioned on the rails or ways 16 and 18 is a carriage 50, which has sockets 52 for receiving the rails therethrough in a sliding relationship. Set screws 54 are furnished to lock the carriage in place and to release the carriage for changing its position for the next cut.

The carriage 50 is adapted to support a router 56, which is shown in FIG. 3. A router is a high-speed, electric power tool that has a revolving vertical spindle and chuck (not shown) for receiving the cutter bit 58. There are many different cutter bits available on the market, but the one employed here is a mortising cutter bit having vertical cutting edges or flutes for milling a plain groove in a work piece. The router 56 has two main segments; namely, a motor 60 and a lower housing 62 in which the motor is adjustably mounted for raising or lowering the motor with respect to the housing so as to be able to alter the depth of the cut. Such adjustable mounting between the motor and the housing may take many forms, but it is not shown here in detail because it does not form part of the present invention. A locking means (not shown) would be provided between the motor and the housing to maintain a fixed setting of the depth of cut, as is conventional in the router art. Other standard equipment is a pair of side handles 64, a depth scale 66 and ON-OFF thumb-operated switches 68 and 70, and a portable power cord 72.

The carriage 50 is furnished with means to accomodate the router 56. First there is a large central opening 74 for receiving the cutter bit 58 therethrough. Next there is a series of radially spaced holes 76 for receiving fastening screws (not shown) that thread into the base of the housing 62 and fasten the router to the carriage.

Looking at FIGS. 3 and 4, a work piece 80 is shown as being an elongated piece or plank of wood which has been finished with one straight edge 82 on the side thereof. The other three sides 84, 86 and 88 are full of surface distorions or blemishes In the method of the present invention, it is first necessary to level the work piece 80 so that the top surface 84 is generally horizontal as is shown in FIG. 3. A series of wedges 90 may be used under the work piece 80 to stabilize the work piece so that it is on a firm foundation and is not subject to deflections or bending during the planing operation.

It is necessary to clamp the work piece 80 firmly to the work bench 28 without providing any obstructions to the free movement of the planing machine 10 over the entire extent of the work piece. End stops 92 bear firmly against the end wall 94 of the work piece and are clamped firmly in place on the work bench by C-clamps 96. This is all of the clamping action that is necessary because the planing machine 10 travels longitudinally of the work piece thus exerting mostly an end thrust along the length of the work piece which is resisted by the stationary end stops 92.

However, it is necessary to guide the direction of the planing machine 10 as it travels over the length of the work piece 80. This guiding action is provided by a datum or guide bar 98 that is supported from the rails or ways 16 and 18, shown at the right side of FIGS. 1 and 3. The datum bar 98 has a socket 100 at each end for receiving the rail 16 or 18 therethrough. Each socket 100 has a set screw 102 for locking the datum bar in place or adjusting the position of the bar along the length of the rails or ways 16 and 18.

The datum bar 98 has a separate angle brace 104 that is supported from the bar by means of a pair of adjustable pin and slot connections 106 and 108 respectively so that the angle brace may be vertically adjusted to accomodate the work piece at hand. Notice the side of the angle brace 104 is caused to bear against the straight edge 82 of the work piece, and this relationship should be maintained during all cutting movement of the planing machine.

It is considered best to provide handles 110 and 112 on the runners 12 and 14 respectively, and to use them for applying a pushing or pulling force on the planing machine 10, rather than to use the two handles 64 of the router 56. This is considered important because it is necessary to apply a downward force on the runners 12 and 14 to maintain good sliding contact between the runners and the top surface 26 of the work bench 28 so as to prevent the sawdust and shavings from slipping beneath the runners and thereby raising the planing machine and hence the cutter bit off of the work piece. If the router handles 64 were used to apply a downward pressure to the runners 12 and 14, then the rails or ways 16 and 18 would tend to bend or deflect depending on the amount of the downward force. Thus, the surface distortions on the work piece would not be removed therefrom.

As seen in both FIGS. 3 and 4, the right side of the top surface 84 of the work piece 80 has been resurfaced by longitudinal cuts made in the work piece as the planing machine 10 is pushed over the length of the work piece from one end to the other. After each pass, either the carriage 50 or the datum bar 98 is repositioned to place the cutter bit 58 in the proper position to take the next cut.

After the entire top surface 84 has been resurfaced, the clamps 96 are removed, and the work piece is inverted to place the resurfaced surface 84 on the top surface 26 of the work bench. The wedges 90 are no longer necessary. The end stops 92 and C-clamps 96 would be reset, and the planing machine set in motion to resurface surface 88. In order to obtain the proper thickness of the final material of the work piece, the router 56 may have to be adjusted several times to lower the cutter bit 58 after each entire pass.

Having described above my invention of a portable planing machine and method of planing, it will be readily understood by those skilled in this art that this planing machine and method enable the transfer of the planar surface 26 of the work bench 28 to the top surface 84 and later 88 of the work piece 80 by means of the cutter bit 58. Neither the weight of the planing machine 10 or the pushing force of the operator result in bending or deflecting the work piece or adding surface distortions to the work piece.

Modifications of this invention will occur to those skilled in this art. Therefore, it is to be understood that this invention is not limited to the particular embodiments disclosed, but that it is intended to cover all modifications which are within the true spirit and scope of the invention as claimed.

What is claimed is:

1. A portable planing machine that is adapted to be supported on a work bench on which a work piece is to be fixdly supported, said machine comprising in combination,
    a. spaced slidable runner means joined together by parallel ways which are adapted to overlie the work piece,
    b. carriage means adjustably mounted on the ways,
    c. a router attached to the carriage means and having a vertically arranged cutter bit that is adapted to plane the top surface of the work piece as the planing machine is moved over the work piece,
    d. and a datum bar carried by the machine and adapted to engage the side of the work piece and guide the movement of the planing machine along the length thereof.

2. The invention of claim 1, wherein at least one of the runners is adjustably mounted to the ways for varying the distance between the runners so as to accomodate work pieces of different sizes.

3. The invention of claim 1 which elevation means associated with each runner for changing the elevation of the planing machine to accomodate work pieces of different sizes.

4. The invention of claim 1, wherein the base plate of each runner is provided with slot means for collecting cuttings which may have passed under the forward surface of the base plate.

5. The invention of claim 1, wherein each runner has a sole plate of low friction material for enhancing the sliding action of the runners over the work bench.

6. The invention of claim 5, wherein each sole plate is provided with slot means for collecting cuttings which may have passed under the forward surface of the sole plate.

7. The invention of claim 1, wherein each runner is provided with handle means for engagement by the operator in effecting the movement of the planing machine relative to the work piece.

8. The invention of claim 1, wherein the datum bar is adjustable along the length of the ways as well as being vertically adjustable so as to accomodate work pieces of different sizes.

9. The invention of claim 2, wherein each runner is provided with handle means for engagement by the operator so as to maintain good contact between the runners and the work bench without causing a deflection of the ways and an otherwise inaccurate cutting action.

10. The invention of claim 9, wherein the datum bar is vertically adjustable so as to accomodate work pieces of different sizes.

11. The invention of claim 10, wherein each runner has a sole plate of low friction material for enhancing the sliding action thereof, each runner also having tapered leading edges for clearing the sawdust and shavings out of the way.

12. The method of planing the surfaces of a work piece so as to remove the minimum amount of material and by an accurate predictable amount, while removing the surface distortions, said method comprising:
    a. leveling a work piece on a work bench so the distortions of the work piece are located nearest the top surface,
    b. installing underpinnings under the work piece to render it stable,
    c. clamping the work piece in place so as to leave the top surface free of obstructions,
    d. straddling the work piece with a portable planing machine that is supported from the work bench and includes a router,
    e. holding the guide bar of the planing machine against the side of the work piece while pushing the machine over the work bench so as to make a cut in the top surface of the work piece,
    f. resetting the position of the router to make an adjacent cut as the machine is again passed over the work piece,
    g. resetting the elevation of the router to change the depth of the cut, until the top surface is planar,
    h. reversing the work piece on the work bench and repeating the clamping and cutting steps until this second top surface is also planar.

13. The method invention of claim 12, wherein the said portable planing machine has spaced runners which are of variable height to accomodate work pieces of different sizes.

14. The method invention of claim 12, wherein the portable planing machine is supported wholly from the work bench.

15. The method invention of claim 14, wherein the planing machine is of variable width to accomodate work pieces of different sizes.

* * * * *